US010743462B2

(12) United States Patent
Setterdahl et al.

(10) Patent No.: US 10,743,462 B2
(45) Date of Patent: Aug. 18, 2020

(54) FLOW SPLITTER FOR DISTRIBUTING AGRICULTURAL PRODUCTS AND RELATED SYSTEM (71) Applicant: CNH Industrial America LLC, New Holland, PA (US)

(72) Inventors: Sven N. Setterdahl, Maquon, IL (US); Joseph W. Knott, Hanna City, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/245,707

(22) Filed: Jan. 11, 2019

(65) Prior Publication Data
US 2020/0221631 A1 Jul. 16, 2020

(51) Int. Cl.
B65G 53/52 (2006.01)
A01C 7/20 (2006.01)
A01C 17/00 (2006.01)
A01C 21/00 (2006.01)

(52) U.S. Cl.
CPC ................ A01C 7/20 (2013.01); A01C 17/00 (2013.01); A01C 21/00 (2013.01)

(58) Field of Classification Search
CPC .................. B65G 53/528; A01C 7/084; Y10T 137/85938
USPC ....... 406/181, 182, 183; 111/175; 137/561 A
See application file for complete search history.

(56) References Cited

U.S. PATENT DOCUMENTS 1,850,937 A   3/1932  Messinger
1,871,853 A   8/1932  Kennedy
2,062,295 A  12/1936  Cary et al.
3,117,697 A   1/1964  Watson
3,652,131 A   3/1972  Carlsson
4,462,140 A * 7/1984  Wood .................... D01G 23/02
                                                    19/105
4,697,686 A  10/1987  West
4,808,043 A   2/1989  Le Marrec et al.
4,817,518 A   4/1989  Wyatt et al.
5,979,343 A * 11/1999  Gregor .................. A01C 7/081
                                                    111/175
6,047,652 A   4/2000  Prairie et al.
(Continued)

FOREIGN PATENT DOCUMENTS

WO   WO 2016135174   9/2016

Primary Examiner — Joseph A Dillon, Jr.
(74) Attorney, Agent, or Firm — Rebecca L. Henkel; Rickard K. DeMille (57) ABSTRACT A flow splitter for distributing agricultural products includes a splitter body extending between upstream and downstream ends and defining an inlet port and two or more outlet ports. The splitter body includes an inner flow surface defining an interior flow volume and two or more internal grooves extending radially outwardly from the inner flow surface. A divider of the flow splitter extends within the splitter body along a central axis and includes two or more divider walls extending radially outwardly from the central axis to a distal end positioned adjacent to the inner flow surface. The divider divides at least a portion of the interior flow volume into a plurality of internal flow chambers, each being aligned with a respective outlet port. A rib extends radially outwardly from the distal end of each respective divider wall such that each rib is received within a respective internal groove.

9 Claims, 10 Drawing Sheets

(56) References Cited

U.S. PATENT DOCUMENTS

| | | | |
|---|---|---|---|
| 6,116,284 A * | 9/2000 | Murray | A01C 7/082 138/39 |
| 6,363,967 B1 * | 4/2002 | Tanaka | F24F 1/0059 137/597 |
| 8,403,602 B2 | 3/2013 | Zarnescu | |
| 8,469,636 B2 | 6/2013 | Jost et al. | |
| 9,648,801 B2 | 5/2017 | Borkgren et al. | |
| 9,797,599 B2 | 10/2017 | Zarnescu et al. | |
| 10,219,425 B2 * | 3/2019 | Friggstad | A01C 7/084 |
| 2001/0016151 A1 * | 8/2001 | Poncelet | A01C 7/082 406/86 |
| 2003/0161694 A1 * | 8/2003 | Bauver | B65G 53/528 406/1 |
| 2009/0178720 A1 * | 7/2009 | Torres | F17D 1/005 137/561 A |
| 2011/0155030 A1 | 6/2011 | Goldman et al. | |
| 2011/0311322 A1 * | 12/2011 | Jost | A01C 7/082 406/181 |
| 2012/0186501 A1 * | 7/2012 | Zarnescu | B65G 53/528 110/101 R |
| 2012/0237304 A1 * | 9/2012 | Zarnescu | F23K 3/00 406/181 |
| 2012/0312211 A1 * | 12/2012 | Hubalek | A01C 7/084 111/175 |
| 2015/0098767 A1 * | 4/2015 | Beaujot | A01C 7/084 406/181 |
| 2016/0120098 A1 | 5/2016 | Hui et al. | |
| 2016/0169592 A1 * | 6/2016 | Mincey | F28D 20/0039 165/10 |
| 2018/0343792 A1 * | 12/2018 | Roberge | A01C 15/04 |
| 2020/0045876 A1 * | 2/2020 | Noble | A01C 7/102 |

* cited by examiner

FLOW SPLITTER FOR DISTRIBUTING AGRICULTURAL PRODUCTS AND RELATED SYSTEM

FIELD OF THE INVENTION

The present subject matter relates generally to the distribution of an agricultural product(s), such as granular fertilizer and/or seeds, to an associated agricultural implement and, more particularly, to a flow splitter for distributing a flow of agricultural product(s), as well as a related system incorporating the flow splitter.

BACKGROUND OF THE INVENTION

Generally, agricultural implements, such as planting implements, are towed behind a tractor or other work vehicle. These implements typically include one or more ground engaging tools or openers that form a path or trench for the deposition of an agricultural product(s) (e.g., seeds, fertilizer, etc.) into the soil. For example, the openers are used to break the soil to enable seed/fertilizer deposition. After deposition of the seeds/fertilizer, each opener may, for example, be followed by a packer wheel that packs the soil on top of the deposited seeds/fertilizer.

In certain configurations, an air cart is used to meter and deliver agricultural product to the ground engaging tools of an agricultural implement. For instance, a flow of agricultural product (e.g., carried by pressurized air) may be delivered from the air cart through one or more hoses to the implement. In such instance, to allow the flow of agricultural product to be supplied to the various ground engaging tools, the flow must be split or divided into various different outlet hoses via a vertical distribution header or through the use of flow splitters. Unfortunately, conventional distribution headers tend to be quite bulky, which can lead to issues when folding an implement into its transport position.

To address these issues, individual two-way or three-way flow splitters have been developed that are designed to split the flow of agricultural product into separate output flows that can be delivered to individual ground engaging tools. However, current flow splitters known in the art still suffer from various drawbacks, including issues associated with a non-uniform distribution of the agricultural product across each of the outlets of the flow splitter. Further, known flow splitters are often manufactured as a single component such that the entire flow splitter must be replaced if a single part becomes worn or damaged.

Accordingly, an improved flow splitter for distributing a flow of agricultural product would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a flow splitter for distributing agricultural products. The flow splitter includes a splitter body extending lengthwise between an upstream end and an opposed downstream end. The splitter body defines an inlet port at or adjacent to its upstream end and two or more outlet ports at or adjacent to its downstream end. Additionally, the splitter body includes an inner flow surface defining an interior flow volume of the splitter body. Moreover, the splitter body further defines two or more internal grooves extending radially outwardly from the inner flow surface. The flow splitter further includes a divider within the splitter body along a central axis. Moreover, the flow splitter includes two or more divider walls extending radially outwardly from the central axis to a distal end positioned adjacent to the inner flow surface of the splitter body. As such, the divider divides at least a portion of the interior flow volume of the splitter body into a plurality of internal flow chambers. Moreover, each internal flow chamber is aligned with a respective outlet port of the outlet ports of the splitter body. In addition, the divider further includes two or more ribs. Each rib extends radially outwardly from the distal end of a respective divider wall such that each rib is received within a respective internal groove of the internal grooves.

In another aspect, the present subject matter is directed to a flow splitter for distributing agricultural products. The flow splitter includes a splitter body extending lengthwise between an upstream end and an opposed downstream end. The splitter body defines an inlet port at or adjacent to its upstream end and two or more outlet ports at or adjacent to its downstream end. Additionally, the splitter body includes an inner flow surface defining an interior flow volume of the splitter body. The flow splitter further includes a divider extending within the splitter body along a central axis. Moreover, the flow splitter includes two or more divider walls extending radially outwardly from the central axis to a distal end positioned adjacent to the inner flow surface of the splitter body. As such, the divider divides at least a portion of the interior flow volume of the splitter body into a plurality of internal flow chambers. Additionally, each internal flow chamber is aligned with a respective outlet port of the outlet ports of the splitter body. Each divider wall defines a radial height between the central axis and the distal end of the divider wall. Moreover, the radial height tapers along a length of each divider wall such that the radial height at an upstream end of each divider wall is greater than the radial height at a downstream end of each divider wall.

In another aspect, the present subject matter is directed to an agricultural product distribution system including an input tube configured to receive an input flow of agricultural product, two or more output hoses provided downstream of the input tube, and a flow splitter provided between the input tube and the plurality of output hoses. As such, the flow splitter transports the input flow of agricultural product from the input tube to the plurality of output hoses. Moreover, the flow splitter includes a splitter body extending lengthwise between an upstream end and an opposed downstream end. The splitter body defines an inlet port at or adjacent to its upstream end and two or more outlet ports at or adjacent to its downstream end. Additionally, the splitter body includes an inner flow surface defining an interior flow volume of the splitter body. Moreover, splitter body further defines two or more internal grooves extending radially outwardly from the inner flow surface. The flow splitter further includes a divider extending within the splitter body along a central axis. Moreover, the flow splitter includes two or more divider walls extending radially outwardly from the central axis to a distal end positioned adjacent to the inner flow surface of the splitter body. As such, the divider divides at least a portion of the interior flow volume of the splitter body into a plurality of internal flow chambers. Moreover, each internal flow chamber is aligned with a respective outlet port of the outlet ports of the splitter body. In addition, the divider further includes a two or more ribs. Each rib extends radially outwardly from the distal end of a respective divider wall such that each rib is received within a respective internal groove of the internal grooves.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved flow splitter for distributing a flow of an agricultural product(s). Specifically, in several embodiments, the flow splitter may include an inlet port and multiple outlet ports, with the inlet port being coupled to an inlet tube or hose (e.g., a dimple tube) and the outlet ports being coupled to respective outlet tubes or hoses. In addition, the flow splitter includes a splitter body and a divider insertable into the splitter body. The divider includes divider walls extending from a central axis to an inner surface of the splitter body for dividing the flow of agricultural product received at the inlet port into separate flows for delivery through the outlet ports to the respective outlet hoses. With such a configuration, the divider may provide more precise and uniform distribution of the flow of agricultural product within the flow splitter than prior flow splitters.

In one embodiment, the splitter body of the flow splitter may include internal grooves configured to receive corresponding radially outwardly extending ribs of the divider when the divider is installed within the splitter body. By configuring the ribs of the divider to be received within the internal grooves of the splitter body, rotation of the divider within the splitter body may be prevented. Further, the rib and internal groove combination may ensure the separate flows of agricultural product align with the respective outlet ports. Additionally, the rib/groove arrangement allows for quick and easy installation and removal of the divider from the splitter body.

Additionally, in one embodiment, a radial height of each of the divider walls may reduce or taper between opposed upstream and downstream ends of the divider wall. Such a configuration may improve the ease with which the divider can be installed within the splitter body. As such, reduced time may be required to assemble the flow splitter after replacement of the divider and/or the splitter body.

Figure 1:
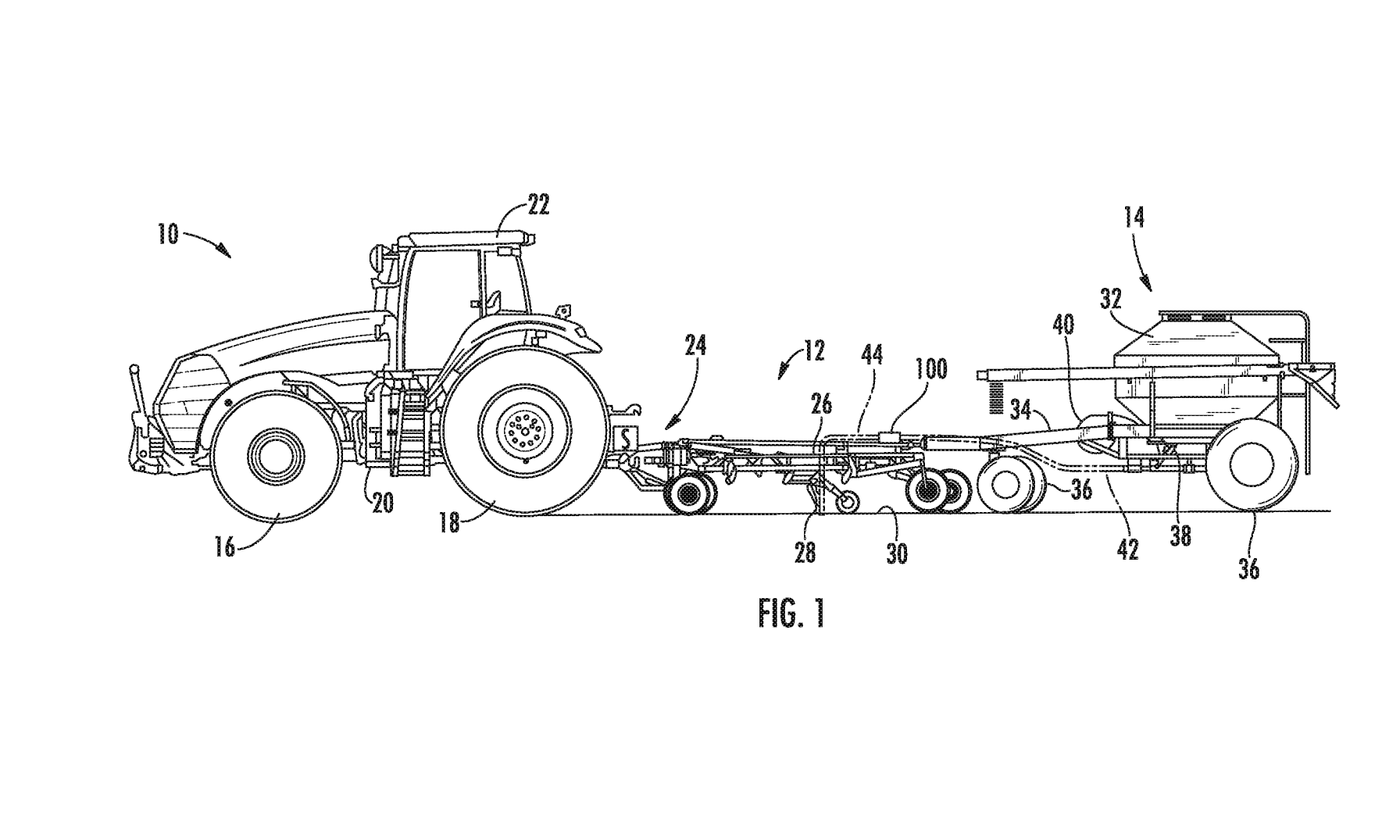
FIG. 1 illustrates a side view of one embodiment of a work vehicle towing an agricultural implement and an associated air cart in accordance with aspects of the present subject matter.
Figure 2:
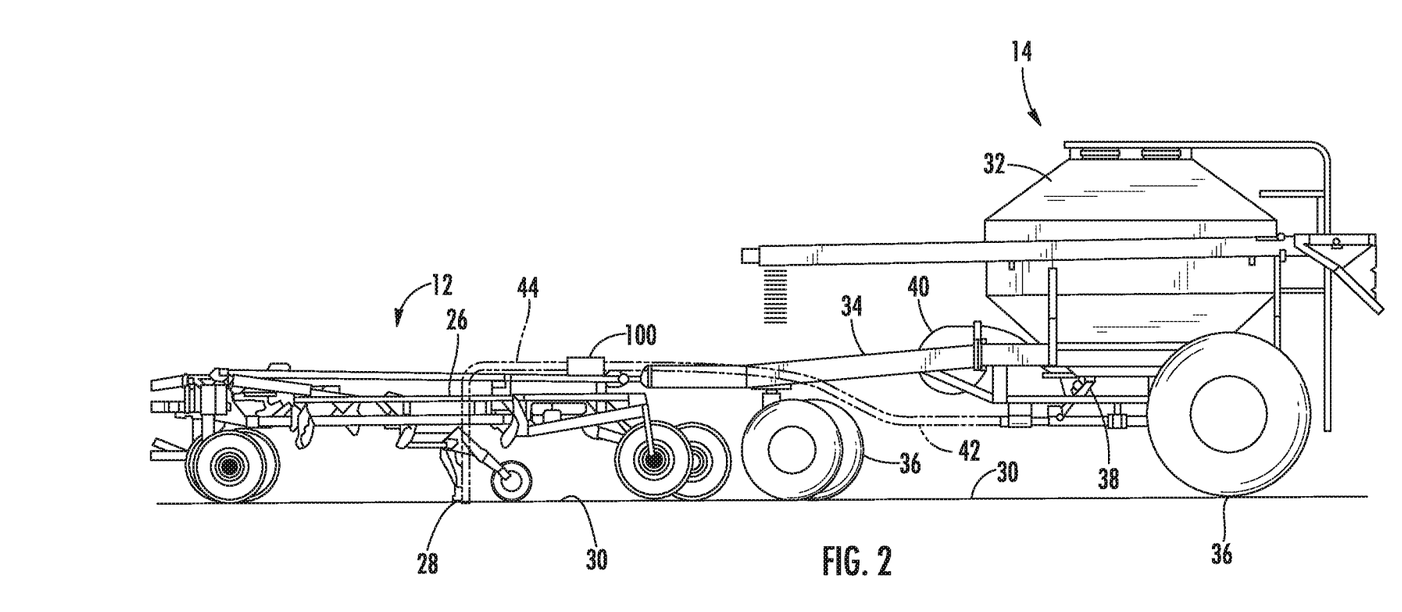
FIG. 2 illustrates a partial, side view of the implement and the air cart shown in FIG. 1.

Referring now to FIGS. 1 and 2, one embodiment of a work vehicle 10 towing an agricultural implement 12 and an associated air cart 14 is illustrated in accordance with aspects of the present subject matter. Specifically, FIG. 1 illustrates a side view of the work vehicle 10, the implement 12, and the air cart 14. Additionally, FIG. 2 illustrates an enlarged, partial side view of the implement 12 and the air cart 14 shown in FIG. 1. It should be appreciated that, although the work vehicle 10 illustrated herein is configured as a tractor, the work vehicle 10 may generally be configured as any suitable work vehicle known in the art, such as any other agricultural vehicle, and/or the like. It should also be appreciated that, although the implement 12 illustrated herein corresponds to a planting implement or planter, the implement 12 may generally correspond to any suitable equipment or implement, such as a seeder, a fertilizer, a tillage implement, and/or the like.

As particularly shown in FIG. 1, the work vehicle 10 includes a pair of front wheels 16, a pair or rear wheels 18, and a chassis 20 coupled to and supported by the wheels 16, 18. An operator's cab 22 may be supported by a portion of the chassis 20 and may house various control devices (not shown) for permitting an operator to control the operation of the work vehicle 10. Additionally, the work vehicle 10 may include an engine (not shown) and a transmission (not shown) mounted on the chassis 20. The transmission may be operably coupled to the engine and may provide variably adjusted gear ratios for transferring engine power to the wheels 16, 18 via a differential (not shown).

As shown in FIG. 1, the work vehicle 10 is coupled to the implement 12 via a hitch assembly 24. It should be appreciated that the hitch assembly 24 may correspond to a hitch of the work vehicle 10 and/or a hitch of the implement 12. Additionally, as shown in FIGS. 1 and 2, the air cart 14 is configured to be coupled to the implement 12 and is towed behind the implement 12 during operation and transport. However, in other embodiments, the air cart 14 may be towed directly behind the work vehicle 10. For example, the air cart 14 may be coupled to the work vehicle 10 via the hitch assembly 24, with the implement 12 being towed behind the air cart 14. In another embodiment, the implement 12 and the air cart 14 may be part of a single unit that is towed behind the work vehicle 10, or elements of a self-propelled vehicle configured to distribute agricultural product across a field.

As particularly shown in FIG. 2, the implement 12 may include a tool frame 26 and one or more ground engaging tools 28 coupled to the tool frame 26. In several embodiments, the ground engaging tool(s) 28 may be configured to excavate a trench into the soil 30 to facilitate deposition of agricultural product. For example, in the illustrated embodiment, the ground engaging tools 28 may be configured to receive a granular or particulate-type agricultural product (e.g., seed, fertilizer, etc.) from the air cart 14. It should be appreciated that, although only one ground engaging tool 28 is shown in FIGS. 1 and 2, the implement 12 may generally include a plurality of ground engaging tools 28 to facilitate delivery of agricultural product(s) across a wide swath of soil 30. For instance, in one embodiment, the implement 12 may include twenty-four ground engaging tools 28 spaced apart across the width of the implement 12. However, in other embodiments, the implement 12 may include any other suitable number of ground engaging tools 28, such as less than twenty-four ground engaging tools or more than twenty-four ground engaging tools.

In the illustrated embodiment, the air cart 14 includes a storage tank 32 for storing an agricultural product(s) to be deposited within the field. In addition, the air cart 14 may include a frame 34, wheels 36, a metering system 38, and a pressurized air source 40. In several embodiments, the frame 34 may include a towing hitch (not shown) configured to be coupled to the implement 12 or the work vehicle 10, thereby allowing the air cart 14 to be towed across a field. Moreover, in certain configurations, the storage tank 32 may include multiple compartments for storing various flowable particulate materials or other granular agricultural products. For example, one compartment may include seeds, and another compartment may include a dry/granular fertilizer. In such configurations, the air cart 14 may be configured to deliver both seed and fertilizer to the implement 12 via the same product distribution system or via separate distribution systems. As indicated above, as an alternative to the illustrated embodiment, the air cart 14 may be disposed between the work vehicle 10 and the implement 12.

In several embodiments, the agricultural product contained within the storage tank 32 may be gravity fed into the metering system 38, thereby allowing the metering system 38 to distribute a desired quantity of the product to the ground engaging tools 28 of the implement 12. As is generally understood, the pressurized air flow from the air source 40 may then carry the product through one or more hoses 42 to the implement 12. As particularly shown in FIG. 2, in several embodiments, the hose 42 may be coupled to one or more flow splitters 100 supported on the implement 12. As will be described below, the flow splitters(s) 100 may be configured to split the flow of agricultural product into multiple separate flows, thereby allowing multiple ground engaging tools 28 to be supplied with agricultural product for deposition into the soil 30. For instance, in several embodiments, each flow splitter 100 may correspond to a three-way splitter configured to split the flow of agricultural product into three separate flows for delivery to three separate ground engaging tools 28, with each flow being delivered to its corresponding ground engaging tool 28 via an output hose 44 coupled between the flow splitter 100 and the ground engaging tool 28. In such embodiments, eight flow splitters 100 may, for example, be utilized to deliver agricultural products to twenty-four separate ground engaging tools 28.

Figure 3:
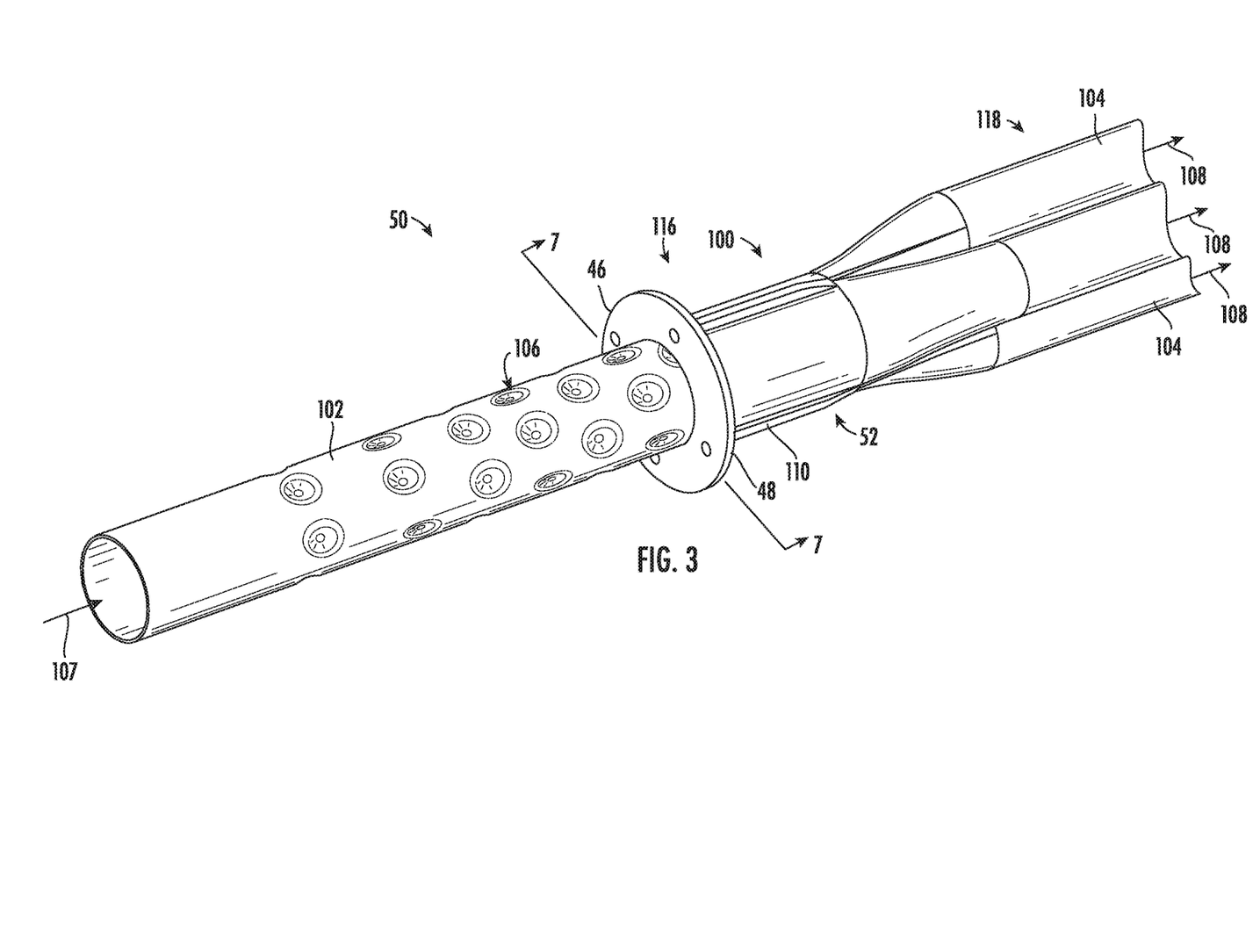
FIG. 3 illustrates a perspective view of one embodiment of an agricultural product distribution system in accordance with aspects of the present subject matter, particularly illustrating the system including an input tube, a flow splitter, and a plurality output hoses.
Figure 4:
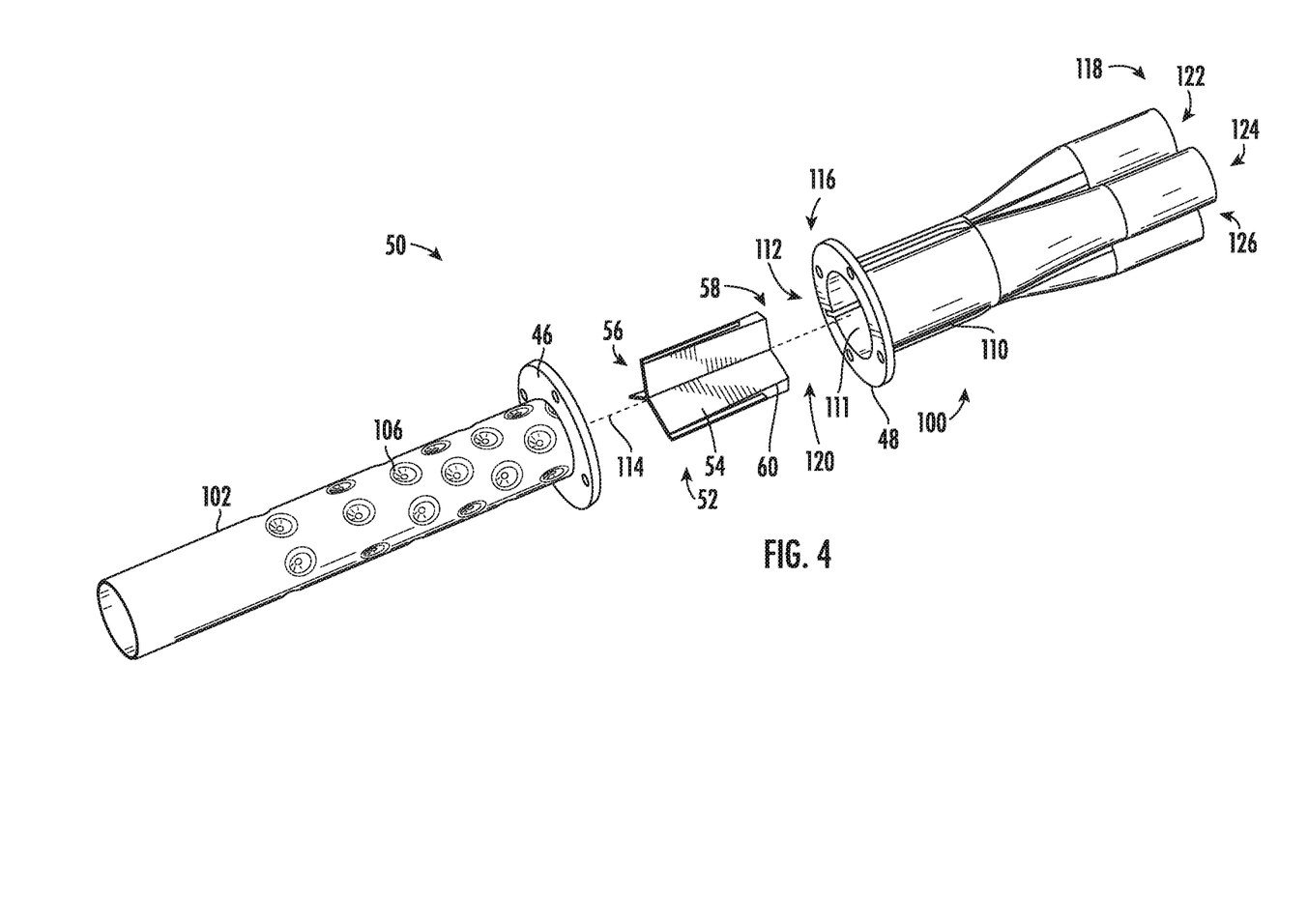
FIG. 4 illustrates an exploded view of several components of the agricultural product distribution system of FIG. 3 in accordance with aspects of the present subject matter, particularly illustrating an internal divider of the flow splitter.

Referring now to FIGS. 3 and 4, differing views of one embodiment of a flow splitter 100 and an associated agricultural product distribution system 50 for distributing a flow of agricultural product are illustrated in accordance with aspects of the present subject matter. Specifically, FIG. 3 illustrates a perspective, assembled view of one embodiment of the agricultural product distribution system 50, particularly illustrating the system 50 including the flow splitter 100 coupled between an associated input tube 102 and corresponding output hoses 104. FIG. 4 illustrates an exploded view of the flow splitter 100 and the input tube of FIG. 3.

As shown in the illustrated embodiment, the flow splitter 100 is configured as a three-way splitter such that a flow of agricultural product (e.g., as indicated by arrow 107 in FIG. 3) received via the input tube 102 is split into three separate flows (e.g., as indicated by arrows 108 in FIG. 3) for delivery to three separate output hoses 104. However, in other embodiments, the flow splitter 100 may be configured to split the flow of agricultural product into more than three separate flows, such as four or more separate flows for delivery to four or more separate output hoses 104.

It should be appreciated that, in general, the input tube 102 may correspond to any suitable tube or conduit for supplying agricultural product to the flow splitter 100. However, as shown in FIGS. 3 and 4, in one embodiment, the input tube 102 may correspond to a dimple tube including a plurality of inwardly extending dimples 106 formed along its exterior. In such an embodiment, the dimples 106 may facilitate consistent distribution of the agricultural product contained within the product flow being supplied into the flow splitter 100 via the input tube 102.

It should also be appreciated that, in one embodiment, the input tube 102 may be coupled to or form part of the hose(s) 42 extending from the air cart 14 (FIGS. 1 and 2) such that the flow of agricultural product directed through such hose(s) 42 is received within the input tube 102. Similarly, in one embodiment, the output hoses 104 may be coupled to or form part of the output hoses 44 described above with reference to FIGS. 1 and 2. As such, the flow of agricultural product expelled from the flow splitter 100 may be transported through the hoses 104/44 to each respective ground engaging tool 28.

As shown in the illustrated embodiment, the flow splitter 100 may generally include a splitter body 110 including an inner flow surface 111 (FIG. 4) defining an interior flow volume 112 (FIG. 4) for receiving and containing the flow of agricultural product being transported between the input tube 102 and the associated output hoses 104. In general, the splitter body 110 may be configured to extend in a lengthwise or flow direction along a central axis 114 (FIG. 4) between an upstream end 116 and an opposed downstream end 118. As particularly shown in FIG. 4, the splitter body 110 may define an inlet port 120 at its upstream end 116 for receiving the flow of agricultural product from the input tube 102. For instance, as shown in FIG. 3, the input tube 102 may be coupled to the splitter body 110 at the inlet port 120 such that the flow of agricultural product supplied through the input tube 102 (e.g., from the air cart 14) is received within the internal flow chamber 112 defined by the splitter body 110. More particularly, as shown, the input tube 102 may include a first flange 46 configured to be mounted to a second flange 48 of the flow splitter 100 in order to couple the input tube 102 and the splitter body 110 together. For example, the first and second flanges 46, 48 may be fastened together using a suitable fastener (e.g., bolts, rivets, screws, etc.), bond, weld, or adhesive.

Additionally, as shown in FIG. 4, the splitter body 110 may define a plurality of output ports at its downstream end 118 for directing the flow of agricultural product supplied through the splitter body 110 to the associated output hoses 104 (FIG. 3). For instance, in the illustrated embodiment, when the flow splitter 100 is configured as a three-way splitter, the splitter body 110 may include three outlet ports (e.g., a first outlet port 122, a second outlet port 124, and a third outlet port 126) defined at or adjacent to its downstream end 118 for directing the flow of agricultural product to the associated output hoses 104 for subsequent delivery to the ground engaging tools 28 of the implement 12.

Referring still to FIG. 4, the flow splitter 100 may further include a divider 52 configured to extend along the central axis 114 from an upstream end 56 to a downstream end 58 within the splitter body 110. More particularly, the divider 52 may be inserted into the splitter body 110 at its upstream end 116 such that the divider 52 is contained within the interior flow volume 112 defined by the inner flow surface 111. The divider 52 may divide at least a portion of the internal flow volume 112 of the splitter body 110 into two or more internal flow chambers (see FIG. 6), such as three internal flow chambers in the embodiment of FIG. 4. Further, each of the internal flow chambers may be in flow communication with an outlet port of the splitter body 110. More particularly, in certain embodiments, each of the internal flow chambers may be aligned with a respective outlet port.

As shown, the divider 52 may include two or more divider walls 54 extending radially outwardly from the central axis 114 to a distal end 60 configured to be positioned adjacent to the inner flow surface 111 of the splitter body 110. It should be appreciated that the divider walls 54 may divide the internal flow volume 112 into the internal flow chambers. For instance, three divider walls 54 may divide the flow volume 112 into the three internal flow chambers corresponding to the outlet ports of the flow splitter 100. More particularly, when the divider 52 includes three divider walls 54, the divider walls define a Y-shaped cross-section along the radial direction to define the three internal flow chambers. However, in other embodiments, the divider 52 may include more or fewer divider walls 54 to divide the internal flow volume 112 into a number of internal flow chambers corresponding to the number of outlet ports of the flow splitter 100.

Figure 5:
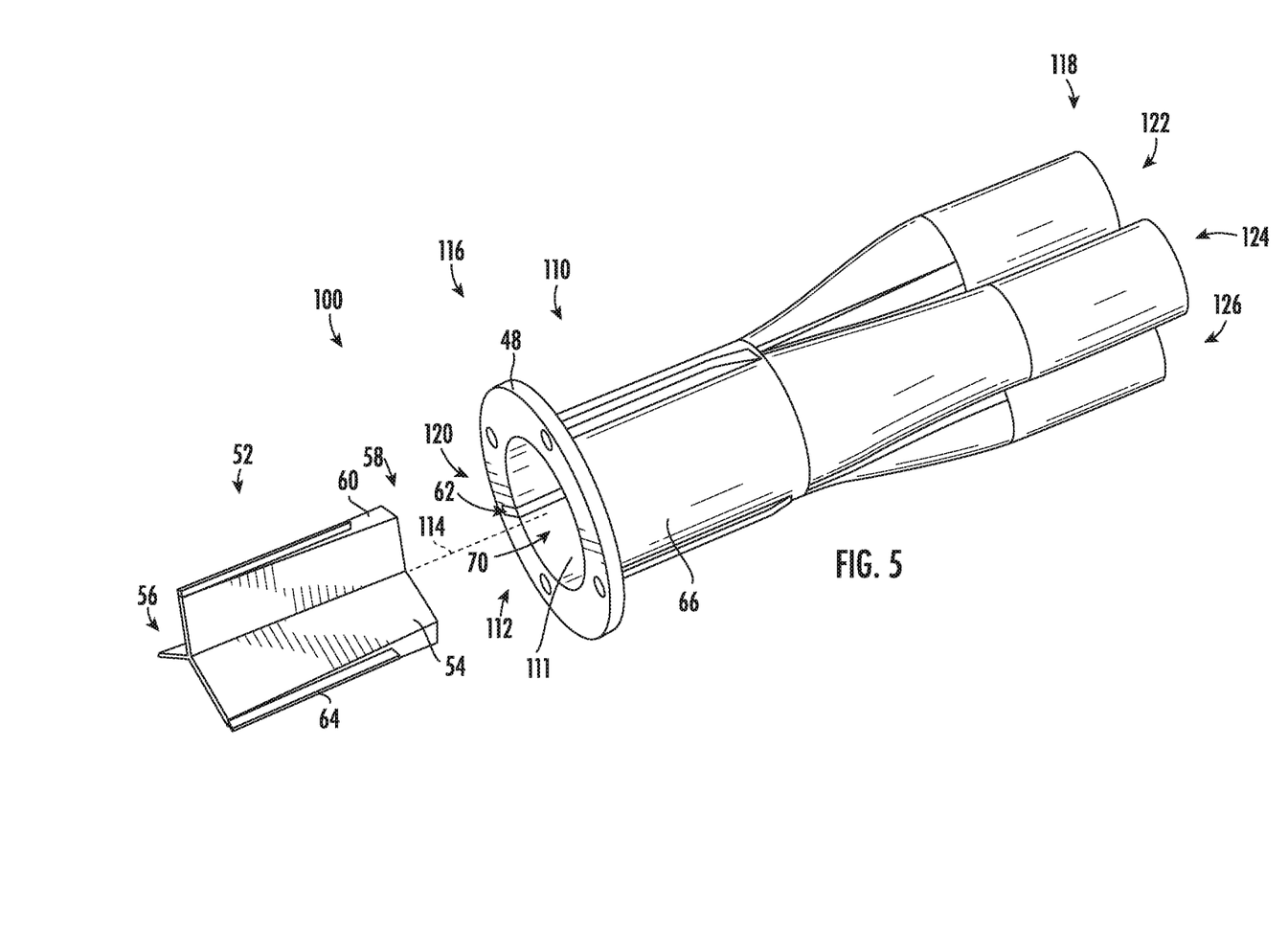
FIG. 5 illustrates a zoomed in view of the flow splitter and divider of FIG. 4 in accordance with aspects of the present subject matter.
Figure 6:
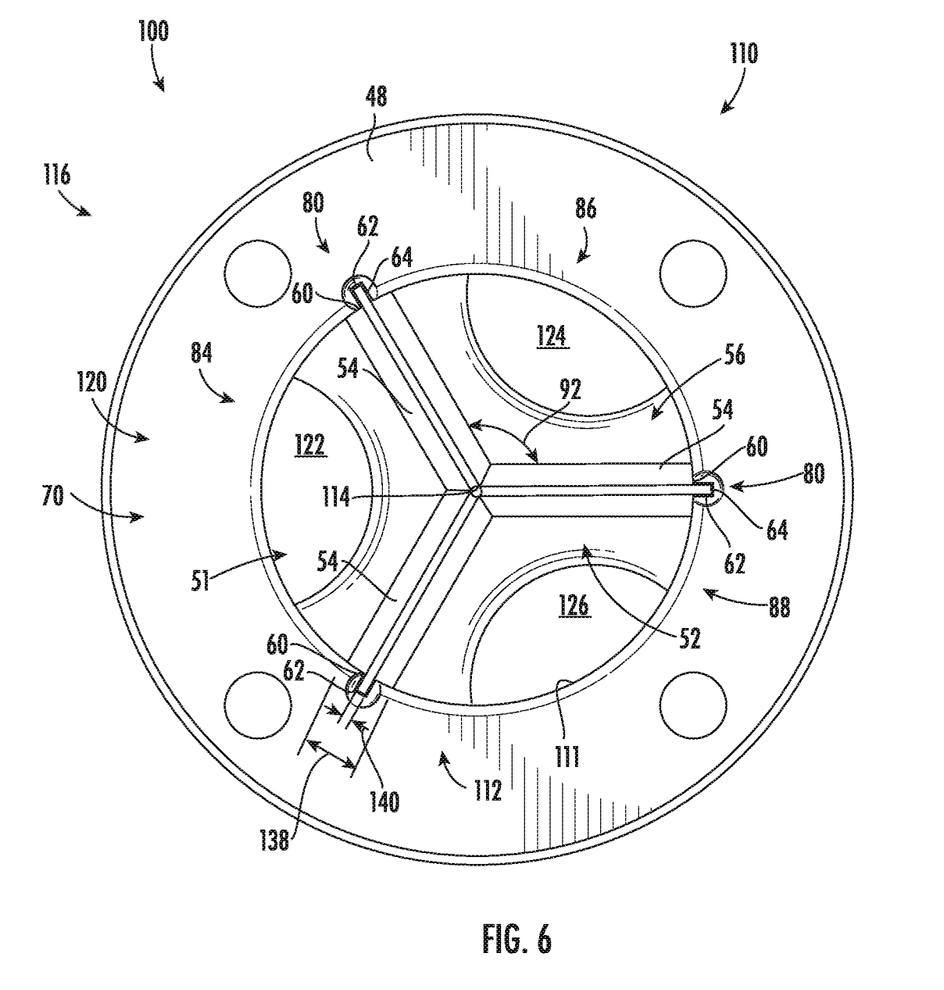
FIG. 6 illustrates a front view of the assembled flow splitter of FIG. 5 in accordance with aspects of the present subject matter.

Referring now to FIGS. 5 and 6, two different views of the flow splitter 100 shown in FIG. 4 are illustrated in accordance with aspects of the present disclosure. Particularly, FIG. 5 illustrates a zoomed in view of the splitter body 110 and the divider 52 of the flow splitter 100 shown in FIG. 4, and FIG. 6 illustrates a front view of the assembled flow splitter 100. As particularly shown in FIG. 6, the splitter body 110 may include two or more internal grooves 62 configured to receive associated ribs 64 of the divider 52. For example, in the illustrated embodiment, the splitter body 110 may include three internal grooves 62 to receive three corresponding ribs 64 of the Y-shaped divider 52. It should be appreciated that the connection between the internal grooves 62 and the ribs 64 may fix the divider 52 within splitter body 110 to prevent rotation of the divider 52 within splitter body 110. Additionally, the connection between the internal grooves 62 and ribs 64 may also align the divider 52 within the splitter body 110. For example, the divider walls 54 may divide the internal flow volume 112 into the internal flow chambers such that each internal flow chamber is aligned with a corresponding outlet port (e.g. first, second, and third outlet ports 122, 124, and 126). Further, it should be appreciated that, by configuring the divider 52 as a separate component receivable within the splitter body 110, the splitter body 110 and/or the divider 52 may be replaced independently from one another. For instance, the divider 52 may wear or fail before the splitter body 110 due to the force imparted on the divider 52 (such as the divider walls 54) by the agricultural product flowing through the flow splitter 100. As such, several embodiments of the present flow splitter 100 may allow for the divider 52 to be replaced independently. Moreover, a divider 52 that is independently replaceable (instead of replacing the entire flow splitter 100) may result in saving costs associated with operating the agricultural product distribution system 50 described herein.

As further depicted in FIGS. 5 and 6, the internal grooves 62 of the splitter body 110 may extend radially outwardly from the inner flow surface 111. For instance, as shown in FIG. 6, a radially inner end of each internal groove 62 may be flush with the inner flow surface 111, with the internal groove 62 extending radially outwardly therefrom toward an outer surface 66 (FIG. 5) of the splitter body 110.

As illustrated, the ribs 64 may extend radially outwardly from the divider walls 54. More particularly, each rib 64 may extend radially outwardly from the distal end 60 of its respective divider wall 54. Further, as shown, each divider wall 54 may define a thickness 138 (FIG. 6) that is larger than a thickness 140 (FIG. 6) of the respective rib 64 extending therefrom along at least a portion of a length of each rib 64. For instance, the rib thickness 140 may be less than the divider wall thickness 138 along the full length of the rib 64. As such, the ribs 64 may be receivable within the internal grooves 62 while the divider walls 54 divide the internal flow volume 112 into the internal flow chambers (FIG. 6). In certain embodiments, as shown particularly in FIG. 6, the distal end 60 of the divider walls 54 may be flush with or abut against the inner flow surface 111 once the divider 52 is inserted within the splitter body 110. It should be appreciated that, by configuring the distal ends 60 of the divider walls 54 to be positioned directly adjacent to or flush with the inner flow surface 111 of the splitter body 110, agricultural product flowing through the flow splitter 100 may be prevented from flowing between the internal flow chambers defined by the divider walls 54.

Referring particularly now to FIG. 6, each internal groove 62 may include an open end 80 defined at the upstream end 116 of the splitter 100 such that the divider 52 may be inserted into the splitter body 110. More particularly, as shown, the open ends 80 of the internal grooves 62 may be defined through the flange 48 of the splitter body 110. Further, as illustrated, the divider 52 may divide the internal flow volume 112 into a number of internal flow chambers (such as three or more). For instance, the divider walls 54 in combination with the inner flow surface 111 may define a first internal flow chamber 84 configured to direct a flow of agricultural product towards the first outlet port 122, a second internal flow chamber 86 configured to direct a flow of agricultural product towards the second outlet port 124, and a third internal flow chamber 88 configured to direct a flow of agricultural product towards the third outlet port 126. However, in other embodiments, the divider 52 may divide the internal flow volume 112 into more or fewer internal flow chambers corresponding to the number of outlet ports of the flow splitter 100.

As further shown in FIG. 6, at least a portion of the splitter body 110 may define a circular cross-sectional shape. For instance, the inner flow surface 111 of the splitter body 110 may generally have a circular cross-sectional shape so as to define a circular internal flow area 51 extending from the upstream end 116 of the splitter body 110 (e.g., the inlet port 120). In such an embodiment, the divider 52 may divide the circular cross-sectional flow area 51 into the various different internal flow chambers.

As further illustrated in the exemplary embodiment of FIG. 6, a circumferential spacing angle 92 (only one of which is shown) may be defined between adjacent divider walls 54 of the divider 52. In the illustrated embodiment, the circumferential spacing angle 92 defined between each pair of adjacent divider walls 54 is approximately the same (e.g., equal to about 120 degrees) such that the divider walls 54 are equally spaced apart circumferentially from one another, thereby creating internal flow chambers within the flow splitter 100 of approximately the same size. In such embodiments, the equally sized internal flow chambers may allow for the flow of the agricultural product 107 (FIG. 3) to be split into approximately equal, but separate flows 108. However, in other embodiments, one or more of the spacing angles 92 may be larger or smaller in order to allow for more or less agricultural product 107 to flow through one or more of the outlet ports.

Figure 7:
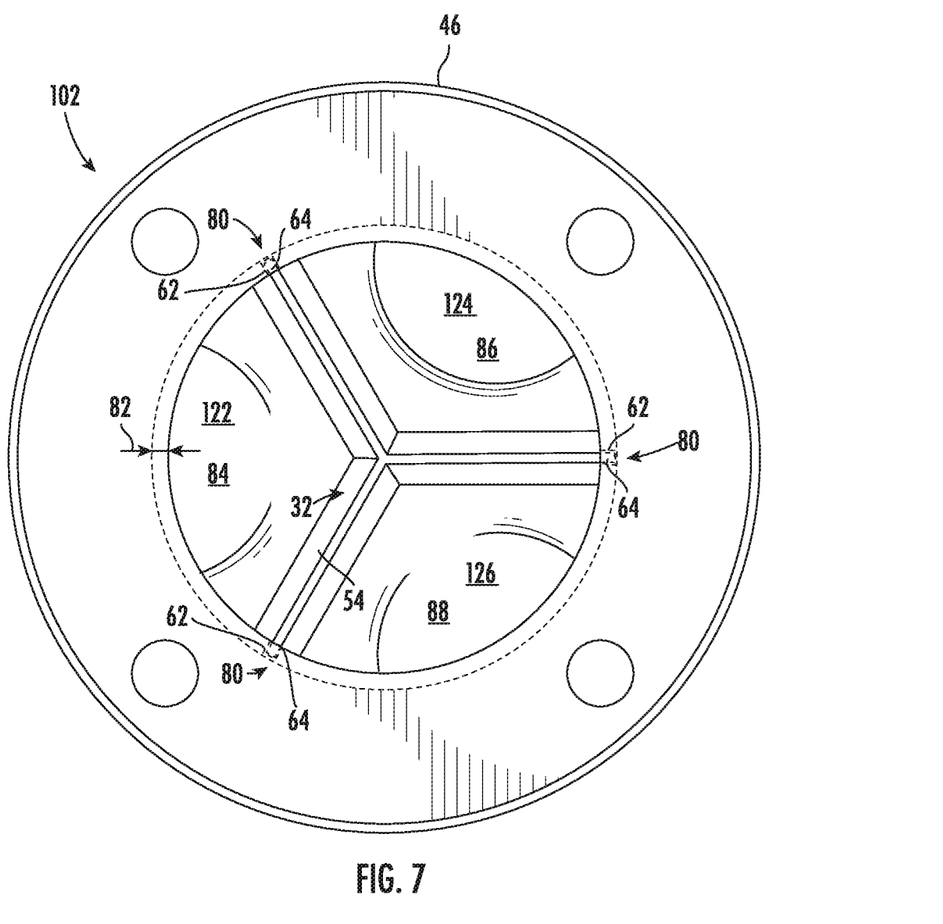
FIG. 7 illustrates a cross-sectional view of the input tube of FIG. 3 in accordance with aspects of the present subject matter, particularly illustrating the cross-section taken at section line 7-7 of FIG. 3.

Referring now to FIG. 7, a cross-sectional view of the input tube 102 of FIG. 3 taken about line 7-7 is illustrated according to aspects of the present disclosure. Generally, the first flange 46 of the input tube 102 may retain the divider 52 within the splitter body 110 (e.g., FIG. 5) when the input tube 102 is coupled to the splitter body 110. More particularly, as shown in FIG. 7, the first flange 46 may radially overlap at least a portion of each internal groove 62 (e.g., across radial overlap distance 82), such as by radially overlapping the open end 80 of each internal groove 62 defined at the upstream end 116 of the splitter body 110. As such, when the first flange 46 of the input tube 102 is secured to the second flange 48 of the splitter body 110, the first flange 46 may secure the divider 52 within the splitter body 110.

Figure 8:
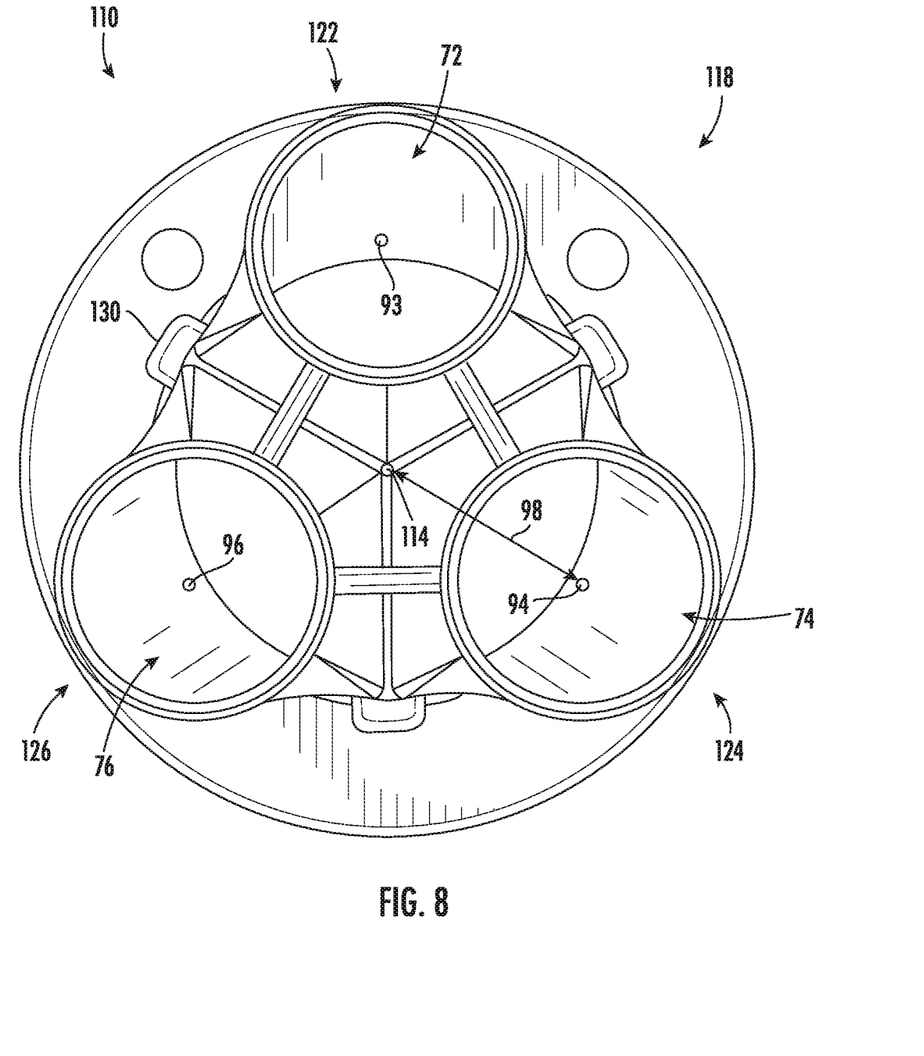
FIG. 8 illustrates a rear view of the splitter body of FIG. 5 in accordance with aspects of the present subject matter, particularly illustrating output ports of the splitter body.

Referring now to FIG. 8, a rear view of the splitter body 110 of FIG. 5 is illustrated according to aspects of the present disclosure. Particularly, FIG. 8 illustrates the outlet ports (e.g., first, second, and third outlet ports 122, 124, 126) of the splitter body 110. Generally, the outlet ports may be arranged evenly around the splitter body 110. More particularly, each of the outlet ports may define an outlet center line, with each centerline being spaced apart equally from the central axis 114 of the splitter body 110. For example, the first outlet port 122 may define a first center line 93, the second outlet port 124 may define a second center line 94, and the third outlet port 126 may define a third center line 96. Further, as shown, each of the outlet center lines may define a radial distance 98 (only one of which is shown) from the central axis 114 of the splitter body 110. In the illustrated embodiment, the radial distance 98 between the central axis 114 and each outlet center line is the same. As such, each of the outlet center lines may be arranged at an equal or approximately equal radial distance 98 from the central axis 114. However, in other embodiments, one or more of the center lines may be arranged at a shorter or longer radial distance 98 from the central axis 114.

Additionally, as illustrated in FIG. 8, the downstream end 118 of the splitter body 110 may further be configured to prevent downstream displacements of the divider 52 (see, e.g., FIGS. 3-7). For example, the splitter body 110 may include a stop 130 aligned with each of the internal grooves 62 to maintain the axial position of the divider 52 within the splitter body 110. For instance, when the input tube 102 is coupled to the splitter body 110, the divider 52 may be captured axially between the flange 46 of the input tube 102 and the stops 130 of the splitter body.

In certain embodiments, as shown in FIG. 8, the outlet ports 122, 124, 126 may be sized in order to prevent slowing down and/or bottling of the flow of agricultural product through the flow splitter 100. For example, the outlet ports 122, 124, 126 may define outlet cross-sectional areas (e.g., a first outlet cross-sectional area 72 of the first outlet port 122, a second outlet cross-sectional area 74 of the second outlet port 124, and a third outlet cross-sectional area 76 of the third outlet port 126). In several embodiments, to prevent bottling of the flow of agricultural product, the summation of the outlet cross-sectional areas may be at least as large as the internal cross-sectional flow area 51 defined at the upstream end 116 of the splitter body 110.

Figure 9:
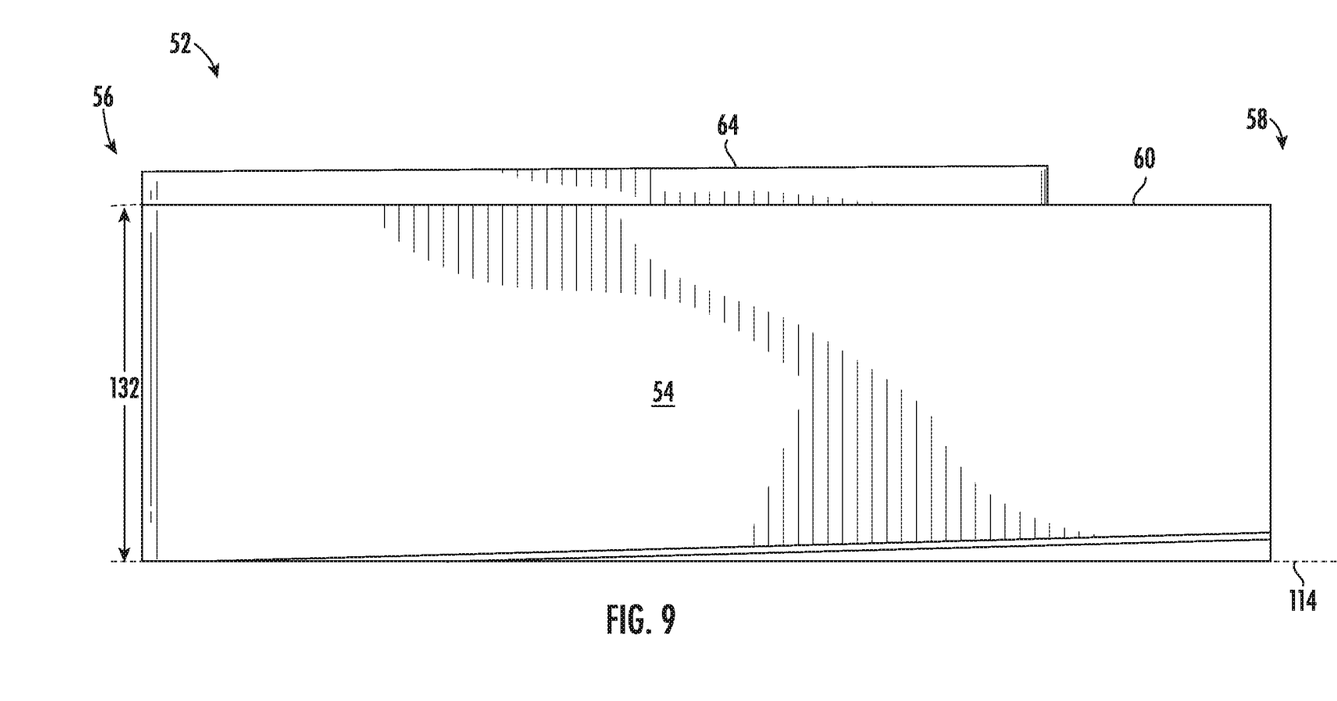
FIG. 9 illustrates a side view of a divider wall of the divider of FIGS. 3-7 in accordance with aspects of the present subject matter.

Referring now to FIG. 9, a portion of the divider 52 shown in FIG. 5 is illustrated, particularly illustrating one of the divider walls 54 of the divider 52. In general, the divider 52 may radially taper between its upstream end 56 and its downstream end 58. Specifically, as shown in FIG. 9, each divider wall 54 may radially taper between the upstream end 56 and the downstream end 58 of the divider 52, thereby allowing the divider 52 to be received and secured within the splitter body 110 (FIG. 5). For example, the smaller or shorter radial profile of the downstream end 58 of the divider 52 may facilitate insertion of the divider 52 within the splitter body. As shown in FIG. 9, each divider wall 54 may define a radial height 132 between the central axis 114 and the distal end 60 of the divider wall 54. In such an embodiment, the radial height 132 may taper along a length of each divider wall 54 such that the radial height 132 at the upstream end 56 of each divider wall 54 is greater than the radial height 132 at a downstream end 58 of each divider wall 54. As such, a first radial height of each divider wall 54 at the upstream end 56 may be longer than a second radial height at the downstream end 58 of the divider wall 54.

Figure 10:
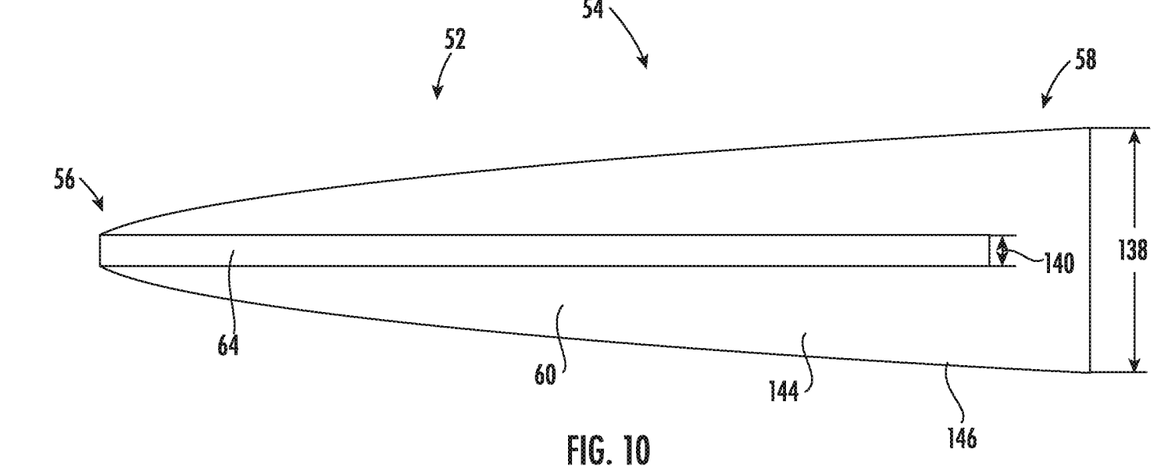
FIG. 10 illustrates a top view of the divider wall of FIG. 9 in accordance with aspects of the present subject matter.

Referring now to FIG. 10 a top view of the divider wall 54 shown in FIG. 9 is illustrated in accordance with aspects of the present subject matter, particularly illustrating the distal end 60 of the divider wall 54 and the top of the corresponding rib 64. As shown in FIG. 10, in one embodiment, the wall thickness 138 of one or more of the divider walls 54 may taper between the upstream and downstream ends 56, 58 of the divider 52. For instance, each divider wall 54 may define a first thickness at the upstream end 56 of the divider 52 that is longer than a second thickness at the downstream end 58 of the divider wall 54. By configuring the divider walls 54 to be thinner at the upstream end 56 of the divider 52, the amount of the agricultural product that impacts the divider walls 54 may be reduced, thereby causing less wear on the divider 52, increasing the lifespan of the divider 52 and reducing the costs associated with operating the agricultural product distribution system 50 (see, e.g., FIG. 3).

As further illustrated with reference to FIG. 10, the distal end 60 of the divider wall 54 may include an exposed surface 144 between the rib 64 and an edge 146 of the divider wall 54 (such as on each side of the rib 64 in the illustrated embodiment of FIG. 10). It should be appreciated that the exposed surface 144 may be created by the difference in thicknesses 138, 140 of the divider wall 54 and the rib 56 (e.g., by the rib thickness 140 being smaller than the divider wall thickness 138 as described above with reference to FIG. 6). Generally, as shown in FIG. 10, the amount of exposed surface 144 may increase between the upstream end 56 and the downstream end 58 of the divider wall 54 with corresponding increases in the thickness 138 of the divider wall 54, particularly in embodiments in which each rib 65 is configured to include a constant thickness 140 along its length. Though the exposed surface 144 is depicted on both sides of the rib 64 in FIG. 10, in other embodiments, the rib 64 may be aligned or approximately aligned with an edge 146 of the distal end 60 of its respective divider wall 54 such that the exposed surface 144 is only defined on one side of the rib 64.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A flow splitter for distributing agricultural products, the flow splitter comprising:
    a splitter body extending lengthwise between an upstream end and an opposed downstream end, the splitter body defining an inlet port at or adjacent to its upstream end and a plurality of outlet ports at or adjacent to its downstream end, wherein the splitter body includes an inner flow surface defining an interior flow volume of the splitter body, the splitter body further defining a plurality of internal grooves extending radially outwardly from the inner flow surface; and
    a divider extending within the splitter body along a central axis, the divider including a plurality of divider walls, with each divider wall extending radially outwardly from the central axis to a distal end positioned adjacent to the inner flow surface of the splitter body such that the divider divides at least a portion of the interior flow volume of the splitter body into a plurality of internal flow chambers, with each internal flow chamber being aligned with a respective outlet port of the plurality of outlet ports of the splitter body;
    wherein the divider further comprises a plurality of ribs, with each rib extending radially outwardly from the distal end of a respective divider wall of the plurality of divider walls such that the rib is received within a respective internal groove of the plurality of internal grooves.

2. The flow splitter of claim 1, wherein each divider wall defines a wall thickness and each rib defines a rib thickness, the rib thickness being less than the wall thickness along at least a portion of a length of each rib.

3. The flow splitter of claim 1, wherein at least one divider wall defines a radial height between the central axis and the distal end of the divider wall, the radial height tapering along a length of the at least one divider wall such that the radial height at an upstream end of the at least one divider wall is greater than the radial height at a downstream end of the at least one divider wall.

4. The flow splitter of claim 1, wherein the divider defines a Y-shaped cross-section.

5. The flow splitter of claim 1, wherein at least one divider wall defines a wall thickness that tapers along a length of the at least one divider wall such that the wall thickness at an upstream end of the at least one divider wall is less than the wall thickness at a downstream end of the at least one divider wall.

6. The flow splitter of claim 1, wherein the splitter body defines a circular cross-section.

7. The flow splitter of claim 1, wherein each outlet port of the plurality of outlet ports defines an outlet center line, and wherein each of the outlet center lines is positioned the same radial distance from the central axis.

8. The flow splitter of claim 1, wherein the plurality of divider walls are equally spaced apart circumferentially from one another.

9. The flow splitter of claim 1, wherein the inlet port defines a first internal cross-sectional area, and wherein each of the outlet ports defines a second internal cross-sectional area, the summation of the second internal cross-sectional areas being equal to or greater than the first internal cross-sectional area.

* * * * *